(12) United States Patent
Choi et al.

(10) Patent No.: US 12,512,867 B2
(45) Date of Patent: Dec. 30, 2025

(54) WIRELESS COMMUNICATION DEVICE AND OPERATING METHOD OF WIRELESS COMMUNICATION DEVICE

(71) Applicant: Samsung Electronics Co., Ltd., Suwon-si (KR)

(72) Inventors: Hongmin Choi, Suwon-si (KR); Heesang Noh, Suwon-si (KR); Kyungwoo Yoo, Suwon-si (KR); Hyungsun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 18/449,130

(22) Filed: Aug. 14, 2023

(65) Prior Publication Data

US 2024/0088926 A1 Mar. 14, 2024

(30) Foreign Application Priority Data

Sep. 13, 2022 (KR) ........................ 10-2022-0115103

(51) Int. Cl.
*H04B 1/04* (2006.01)
*H04B 15/00* (2006.01)
*H04L 25/02* (2006.01)
*H04L 25/03* (2006.01)
*H04L 25/06* (2006.01)
*H04L 27/36* (2006.01)

(52) U.S. Cl.
CPC ..... *H04B 1/0475* (2013.01); *H04B 2001/045* (2013.01)

(58) Field of Classification Search
None
See application file for complete search history.

(56) References Cited

U.S. PATENT DOCUMENTS

| 7,313,373 | B1 | 12/2007 | Laskharian et al. |
| 7,881,404 | B2 | 2/2011 | Ishikawa et al. |
| 8,446,979 | B1 * | 5/2013 | Yee ........................ H03F 1/3258 375/295 |

(Continued)

FOREIGN PATENT DOCUMENTS

| JP | 2004015364 A | 1/2004 |
| JP | 2017199973 A | 11/2017 |

*Primary Examiner* — Pablo N Tran
(74) *Attorney, Agent, or Firm* — Wolf, Greenfield & Sacks, P.C.

(57) ABSTRACT

A wireless communication device includes a pre-distortion circuit configured to generate a pre-distortion signal by pre-distorting an input signal based on a pre-distortion coefficient, a power amplifier configured to generate an output signal by amplifying the pre-distortion signal, a measurement circuit configured to measure a magnitude of a first frequency component of a first adjacent channel and a magnitude of a second frequency component of a second adjacent channel of the output signal, a filtering circuit, that includes an error filter, configured to generate a filtered error signal by filtering an error signal that is based on the input signal and the output signal, the error filter is configured based on the magnitude of the first frequency component and the magnitude of the second frequency component, and a pre-distortion coefficient update circuit configured to update the pre-distortion coefficient based on the error signal or the filtered error signal.

20 Claims, 10 Drawing Sheets

(56) References Cited

U.S. PATENT DOCUMENTS

| | | | |
|---|---|---|---|
| 8,773,201 B2 | 7/2014 | Yamamoto et al. | |
| 8,873,677 B1 | 10/2014 | Loh et al. | |
| 9,014,299 B2* | 4/2015 | Teterwak | H04L 27/368 |
| | | | 375/296 |
| 9,026,391 B2 | 5/2015 | Sogl et al. | |
| 9,190,964 B2* | 11/2015 | Utsunomiya | H03F 3/24 |
| 9,438,177 B2* | 9/2016 | Chang | H03F 1/3247 |
| 9,450,544 B2* | 9/2016 | Chang | H03F 1/3247 |
| 10,630,323 B2 | 4/2020 | Spring et al. | |
| 10,637,694 B1 | 4/2020 | Nammi et al. | |
| 10,826,732 B2 | 11/2020 | Kim et al. | |
| 10,999,742 B2 | 5/2021 | Hassan Hussein et al. | |
| 11,133,834 B2* | 9/2021 | Choi | H03F 1/3247 |
| 2020/0059256 A1* | 2/2020 | Cao | H03F 1/3252 |
| 2020/0169334 A1* | 5/2020 | Li | H03F 3/189 |
| 2020/0186103 A1* | 6/2020 | Weber | H04L 27/368 |
| 2020/0412391 A1* | 12/2020 | Belitzer | H03F 3/24 |

\* cited by examiner

WIRELESS COMMUNICATION DEVICE AND OPERATING METHOD OF WIRELESS COMMUNICATION DEVICE

CROSS-REFERENCE TO RELATED APPLICATION

This application is based on and claims priority under 35 U.S.C. § 119 to Korean Patent Application No. 10-2022-0115103, filed on Sep. 13, 2022, in the Korean Intellectual Property Office, the disclosure of which is incorporated by reference herein in its entirety.

BACKGROUND

The inventive concept relates to a wireless communication device, and more particularly, to a wireless communication device for adjusting a magnitude of a frequency component by using an error filter.

A wireless communication device may amplify a transmission signal through a power amplifier. The power amplifier ideally has a linear characteristic of linearly amplifying a transmission signal. However, to increase the efficiency of the power amplifier, the power amplifier nonlinearly operates.

When the power amplifier nonlinearly operates, an error vector magnitude (EVM) value of a transmission signal increases, thereby resulting in a high possibility that an error may occur. In addition, an adjacent channel leakage ratio (ACLR) value, which is one of the measurement values of a magnitude of a frequency component, may increase, thereby causing distortion in an adjacent frequency band and interference with a signal of an adjacent band.

To solve this, research for a scheme of connecting a pre-distortion circuit to a front end of a power amplifier to compensate for the nonlinearity of the power amplifier have been recently conducted.

SUMMARY

The inventive concept provides a wireless communication device for adjusting a magnitude of a frequency component by using an error filter.

According to some embodiments of the inventive concept, there is provided a wireless communication device including a pre-distortion circuit configured to generate a pre-distortion signal by pre-distorting an input signal based on a pre-distortion coefficient, a power amplifier configured to generate an output signal by amplifying the pre-distortion signal, a measurement circuit configured to measure a magnitude of a first frequency component of a first adjacent channel and a magnitude of a second frequency component of a second adjacent channel of the output signal, a filtering circuit that includes an error filter, configured to generate a filtered error signal by filtering an error signal that is based on the input signal and the output signal generated by the power amplifier. The error filter is configured to generate the error signal based on the magnitude of the first frequency component and the magnitude of the second frequency component, and a pre-distortion coefficient update circuit configured to update the pre-distortion coefficient based on the error signal or the filtered error signal.

According to some embodiments of the inventive concept, there is provided an operating method of a wireless communication device, the operating method including updating a pre-distortion coefficient based on an error signal determined based on an input signal and an output signal, measuring a magnitude of a first frequency component of a first adjacent channel and a magnitude of a second frequency component of a second adjacent channel by the output signal, configuring an error filter based on the magnitude of the first frequency component and the magnitude of the second frequency component when a filtering condition is satisfied, generating a filtered error signal by using the error filter to filter the error signal, updating the pre-distortion coefficient based on the filtered error signal, and generating the output signal by pre-distorting and amplifying the input signal based on the pre-distortion coefficient that was updated.

According to some embodiments of the inventive concept, there is provided a wireless communication device including a processor configured to generate a pre-distortion signal by pre-distorting an input signal based on a pre-distortion coefficient, a radio frequency (RF) transmitter configured to generate an output signal by amplifying the pre-distortion signal, and an antenna configured to transmit the output signal, wherein the processor is further configured to measure a magnitude of a first frequency component of a first adjacent channel and a magnitude of a second frequency component of a second adjacent channel by the output signal, and generate a filtered error signal by filtering an error signal determined based on the input signal and the output signal. The filtering is performed using an error filter configured based on the magnitude of the first frequency component and the magnitude of the second frequency component, and the pre-distortion coefficient is updated based on the error signal or the filtered error signal.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, embodiments are described in detail with reference to the accompanying drawings.

Figure 1:
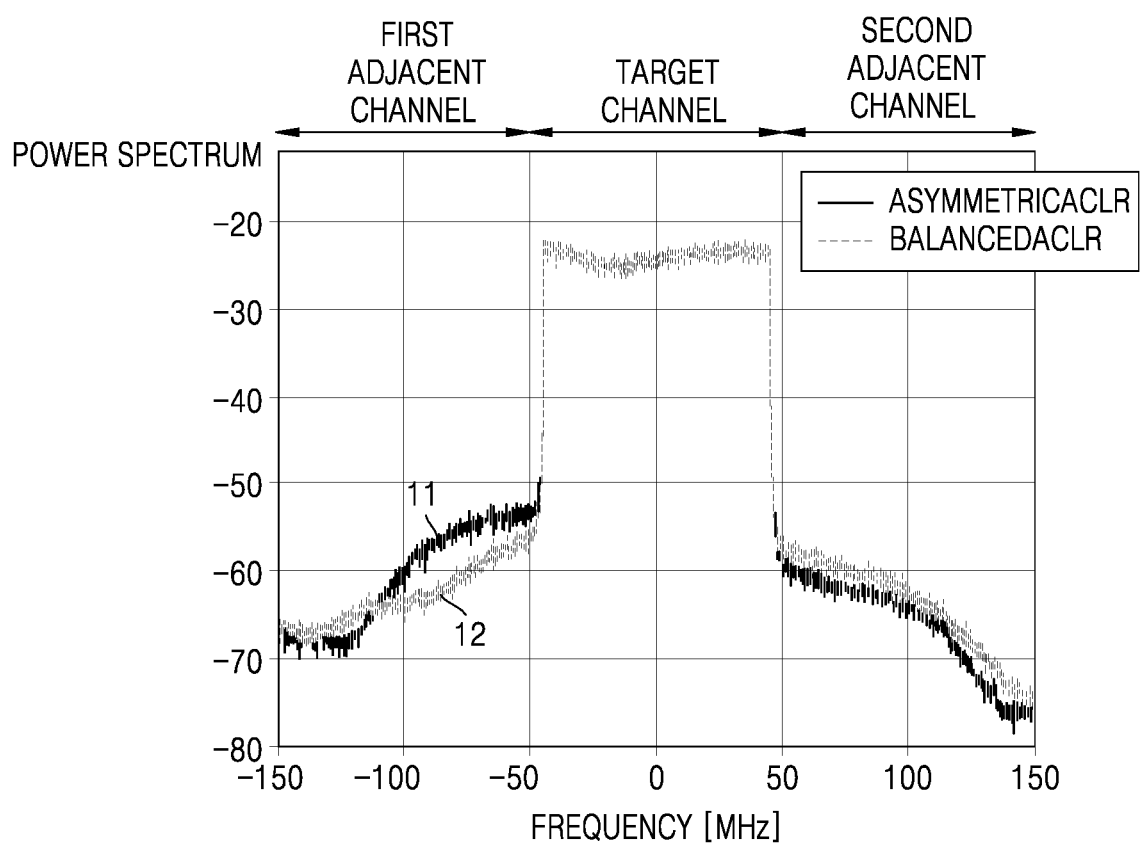
FIG. 1 is a graph illustrating power spectra of a target channel, a first adjacent channel, and a second adjacent channel.

FIG. 1 is a graph 10 illustrating power spectra of a target channel, a first adjacent channel, and a second adjacent channel.

Referring to FIG. 1, the graph 10 shows the power spectra of the target channel, the first adjacent channel, and the second adjacent channel by an output signal of a power amplifier. The output signal of the power amplifier having nonlinearity may be amplified in the target channel and cause interference in the first adjacent channel and the second adjacent channel, which are adjacent to the target channel on the frequency axis.

The third Generation Partnership Project (3GPP) regulates that an interference amount does not exceed a particular numeric value, through an adjacent channel leakage ratio (ACLR) value that is one of the measurement values of a magnitude of a frequency component. The ACLR value is obtained by calculating a difference between power of the target channel and leakage power of an adjacent channel separated by a certain offset frequency from the target channel. In fifth generation new radio (5G NR), the 3GPP standard 38.101 defines a specification of ACLR values for radio frequency (RF) spectra, and particularly, defines a specification that an ACLR value for left and right adjacent channels shall be less than −31 dB (PC2)/−30 dB (PC3) in frequency range 1 (FR1).

In each of the first adjacent channel and the second adjacent channel that are both side bands adjacent to the target channel on the frequency axis, an ACLR value with respect to the target channel may be measured. Herein, both a first ACLR value that is an ACLR value obtained from the first adjacent channel and a second ACLR value that is an ACLR value obtained from the second adjacent channel should satisfy the specification, and channel quality in terms of ACLR value is determined by the worse one of the first ACLR value and the second ACLR value.

FIG. 1 shows a first spectrum 11 in which the first ACLR value is asymmetrical to the second ACLR value and a second spectrum 12 in which the first ACLR value is symmetrical to the second ACLR value. In terms of ACLR value, the channel quality of the second spectrum 12 is better than the channel quality of the first spectrum 11. In this case, to make the channel quality of the first spectrum 11 be the same as or similar to the channel quality of the second spectrum 12, a voltage of a power amplifier may be increased, thereby resulting in an increase in current consumption.

To solve this, the inventive concept proposes a wireless communication device capable of reducing ACLR values of adjacent channels while controlling the ACLR values to be symmetrical with each other so as to increase channel quality in terms of ACLR value without increasing a voltage of a power amplifier or current consumption. An operating method of the wireless communication device is also provided.

Figure 2:
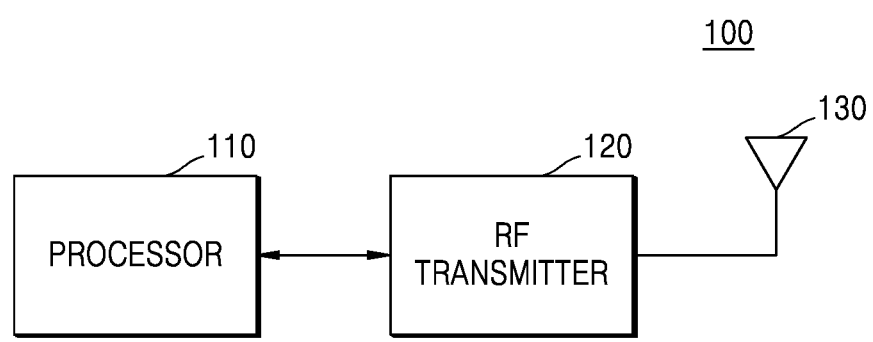
FIG. 2 is a block diagram illustrating a wireless communication device according to some embodiments.

FIG. 2 is a block diagram illustrating a wireless communication device 100 according to some embodiments.

Referring to FIG. 2, the wireless communication device 100 according to some embodiments may include a processor 110, a radio frequency (RF) transmitter 120, and an antenna 130.

The wireless communication device 100 may access a wireless communication system by transmitting and receiving signals through the antenna 130. The wireless communication system which the wireless communication device 100 acesses may be referred to as radio access technology (RAT) and be, as a non-limiting example, a wireless communication system using a cellular network, such as a 5G wireless system, a long term evolution (LTE) system, an LTE-advanced system, a code division multiple access (CDMA) system, or a global system for mobile communication (GSM) system, a wireless local area network (WLAN) system, or another wireless communication system. Hereinafter, a description is made under the assumption that the wireless communication system which the wireless communication device 100 accesses is a wireless communication system using a cellular network, but it would be understood that embodiments are not limited thereto.

A wireless communication network of the wireless communication system may share available network resources to support a plurality of wireless communication devices including the wireless communication device 100 to communicate with each other. For example, in the wireless communication network, information may be transferred by various multiple access schemes, such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and/or OFDM-CDMA.

The wireless communication device 100 may be referred to as an arbitrary device accessing the wireless communication system. As an example of the wireless communication device 100, a base station (BS) may be generally referred to as a fixed station for communicating with a user device and/or another BS and exchange data and control information with the user device and/or the other BS by communicating with the user device and/or the other BS. For example, the BS may be referred to as a Node B, an evolved-Node B (eNB), a next generation Node B (gNB), a sector, a site, a base transceiver system (BTS), an access point (AP), a relay node, a remote relay head (RRH), a radio unit (RU), a small cell, or the like. In the inventive concept, a BS or a cell may be understood as a comprehensive meaning indicating a partial area or function covered by a base station controller (BSC) in CDMA, a Node B in wideband code division multiple access (WCDMA), or an eNB or sector (site) in LTE, or the like and include all of various coverage areas, such as a mega-cell communication coverage, a macro-cell communication coverage, a micro-cell communication coverage, a pico-cell communication coverage, a pemto-cell communication coverage, a relay node communication coverage, an RRH communication coverage, an RU communication coverage, and a small cell communication coverage.

As an example of the wireless communication device 100, a user equipment (UE) may be stationary or mobile and may be referred to as arbitrary devices capable of transmitting and receiving data and/or control information to and from a BS by communicating with the BS. For example, the UE may be referred to as a terminal equipment, a mobile station (MS), a mobile terminal (MT), a user terminal (UT), a subscriber station (SS), a wireless device, a handheld device, or the like.

The wireless communication device 100 may further include various components besides the components shown in FIG. 2.

The processor 110 may control a general operation of the wireless communication device 100, and for example, the processor 110 may be a central processing unit (CPU). The processor 110 may include a single processor core (single core) or a plurality of processor cores (multi-core). The processor 110 may process or execute programs and/or data stored in a memory. In some embodiments, the processor 110 may execute the programs stored in the memory to control various functions of the wireless communication device 100 or perform various calculations.

The processor 110 may generate a pre-distortion signal by pre-distorting an input signal based on a pre-distortion coefficient. In addition, the processor 110 may measure a magnitude of a first frequency component of a first adjacent channel (e.g., the first ACLR value) and a magnitude of a second frequency component of a second adjacent channel (e.g., the second ACLR value) by an output signal of the RF transmitter 120 and configure an error filter based on the measurement result. In addition, the processor 110 may generate a filtered error signal by filtering an error signal through the error filter and update the pre-distortion coefficient based on the filtered error signal. A more detailed structure and operation of the processor 110 are described below with reference to FIGS. 3 and 4.

The RF transmitter 120 may be connected to the processor 110. The RF transmitter 120 may receive the pre-distortion signal from the processor 110. The RF transmitter 120 may generate the output signal by amplifying the pre-distortion signal. The RF transmitter 120 may amplify the pre-distortion signal through a power amplifier therein. Herein, because the power amplifier has nonlinearity, the nonlinearity of the power amplifier may be compensated for by receiving and amplifying the pre-distortion signal pre-distorted by the processor 110. A more detailed structure and operation of the RF transmitter 120 are described below with reference to FIGS. 3 and 4.

The antenna 130 may be connected to the RF transmitter 120. The antenna 130 may receive the output signal from the RF transmitter 120. The antenna 130 may transmit the received output signal to another wireless communication device. In addition, the antenna 130 may receive a signal from another wireless communication device. In FIG. 2, some components used to receive a signal from another wireless communication device through the antenna 130 may be omitted. In some embodiments, the wireless communication device 100 may include a plurality of antennas for phased array, multiple-input and multiple-output (MIMO), or the like.

Figure 3:
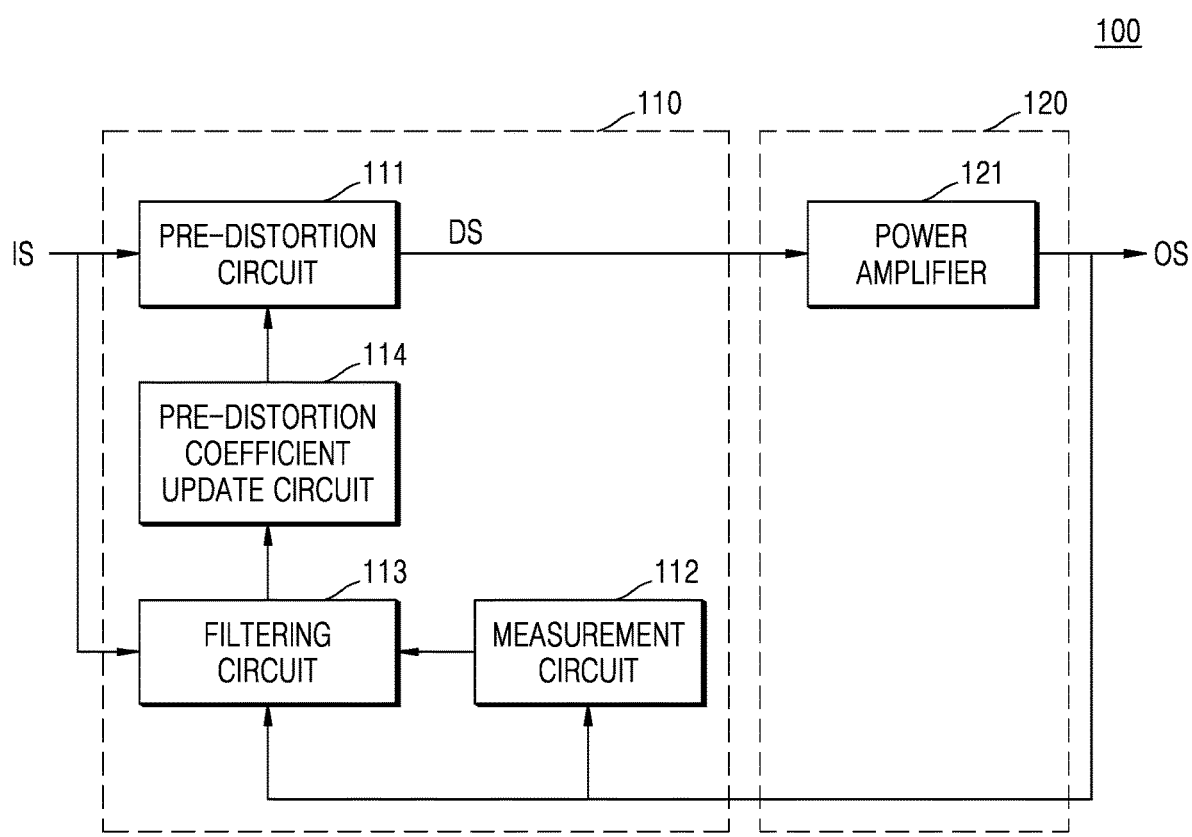
FIG. 3 is a block diagram illustrating main components included in the wireless communication device according to some embodiments.

FIG. 3 is a block diagram illustrating main components included in the wireless communication device 100 according to some embodiments.

Referring to FIG. 3, the processor 110 of the wireless communication device 100 according to some embodiments may include a pre-distortion circuit 111, a measurement circuit 112, a filtering circuit 113, and a pre-distortion coefficient update circuit 114. In addition, the RF transmitter 120 of the wireless communication device 100 according to some embodiments may include a power amplifier 121.

The pre-distortion circuit 111 may pre-distort an input signal IS to compensate for the nonlinearity of the power amplifier 121. Pre-distortion is a characteristic opposite to the nonlinearity of the power amplifier 121 and may be referred to as a scheme of previously distorting the input signal IS.

The pre-distortion circuit 111 may generate a pre-distortion signal DS by pre-distorting the input signal IS. The pre-distortion circuit 111 may provide the pre-distortion signal DS to the power amplifier 121.

The pre-distortion circuit 111 may pre-distort the input signal IS based on a pre-distortion coefficient. The pre-distortion coefficient may be provided by the pre-distortion coefficient update circuit 114. The pre-distortion coefficient may include a plurality of coefficients to be used for pre-distortion.

The pre-distortion circuit 111 may be implemented in various forms, and in some embodiments, the pre-distortion circuit 111 may be implemented as hardware or software or as a combination thereof. When the pre-distortion circuit 111 is implemented as hardware, the pre-distortion circuit 111 may include circuits configured to pre-distort the input signal IS. In some embodiments, when the pre-distortion circuit 111 is implemented as software, pre-distortion may be performed by executing a program and/or instructions loaded in a memory. However, the inventive concept is not limited to the embodiments described above, and the pre-distortion circuit 111 may be implemented as a combination of software and hardware, like firmware.

The power amplifier 121 may generate an output signal OS by amplifying the pre-distortion signal DS. The power amplifier 121 requires a linear characteristic for an output characteristic but may have nonlinearity due to the own characteristic of the power amplifier 121 or various causes of the surroundings. Therefore, the power amplifier 121 may compensate for the nonlinearity of the power amplifier 121 by receiving and amplifying the pre-distortion signal DS pre-distorted by the pre-distortion circuit 111. The output signal OS may be provided to the measurement circuit 112.

The measurement circuit 112 may measure a magnitude of a first frequency component of a first adjacent channel and a magnitude of a second frequency component of a second adjacent channel by the output signal OS. The measurement circuit 112 may receive the output signal OS of the power amplifier 121. In addition, the measurement circuit 112 may measure the magnitude of the first frequency component and the magnitude of the second frequency component.

The magnitude of the first frequency component may be a magnitude of a frequency component, which is measured with respect to the first adjacent channel to a target channel that is a channel in which the output signal OS is output. In addition, the magnitude of the second frequency component may be a magnitude of a frequency component, which is measured with respect to the second adjacent channel to the target channel in an opposite direction to the first adjacent channel. In some embodiments, the first adjacent channel may be a channel having a lower frequency band than the target channel, and the second adjacent channel may be a channel having a higher frequency band than the target channel. In some embodiments, the first adjacent channel may be a channel having a higher frequency band than the target channel, and the second adjacent channel may be a channel having a lower frequency band than the target channel.

The measurement circuit 112 may determine whether a filtering condition is satisfied. The filtering condition may be a condition for determining whether an error signal is filtered through the filtering circuit 113. The filtering condition may be set for the filtering circuit 113 to filter an error signal when fine tuning of the magnitude of the first frequency component and the magnitude of the second frequency component is necessary after the magnitude of the first frequency component and the magnitude of the second frequency component are somewhat reduced by updating the pre-distortion coefficient.

In some embodiments, the filtering condition may include at least one of whether the magnitude of the first frequency component and the magnitude of the second frequency component are converged and whether a pre-distortion coefficient update number is greater than a reference update number. The frequency components are converged when the power spectrum of the channel quality is equal (for example, approximately equal) to one another.

When the filtering condition is whether the magnitude of the first frequency component and the magnitude of the second frequency component are converged, the measurement circuit 112 may determine that the filtering condition is satisfied if it is determined that the magnitude of the first frequency component and the magnitude of the second frequency component are converged.

When the filtering condition is whether the pre-distortion coefficient update number is greater than the reference update number, the measurement circuit 112 may determine that the filtering condition is satisfied if it is determined that the pre-distortion coefficient update number is greater than or equal to a preset reference update number (e.g., 20).

When the filtering condition is whether the magnitude of the first frequency component and the magnitude of the second frequency component are converged or whether the pre-distortion coefficient update number is greater than the reference update number, the measurement circuit 112 may determine that the filtering condition is satisfied if it is determined that the magnitude of the first frequency component and the magnitude of the second frequency component are converged or that the pre-distortion coefficient update number is greater than or equal to the reference update number.

As described above, the filtering condition may include at least one of whether the magnitude of the first frequency component and the magnitude of the second frequency component are converged and whether the pre-distortion coefficient update number is greater than the reference update number, but the inventive concept is not limited thereto, and various types of filtering conditions may be set depending on a configuration of a user.

If it is determined that the filtering condition is satisfied, the measurement circuit 112 may configure an error filter to be used in the filtering circuit 113.

In some embodiments, the measurement circuit 112 may configure the error filter based on the magnitude of the first frequency component and/or the magnitude of the second frequency component.

The measurement circuit 112 may configure the error filter based on the magnitude of the first frequency component and the magnitude of the second frequency component if a difference value between the magnitude of the first frequency component and the magnitude of the second frequency component is greater than or equal to a reference difference value. The reference difference value may be a reference value for determining whether the magnitude of the first frequency component is asymmetrical to the magnitude of the second frequency component. If the difference value between the magnitude of the first frequency component and the magnitude of the second frequency component is greater than or equal to the reference difference value, the measurement circuit 112 may configure the error filter to pass therethrough a signal of a frequency band having a higher magnitude of a frequency component so that the pre-distortion coefficient is updated based on the passed signal of the frequency band.

If the magnitude of the first frequency component is greater than the magnitude of the second frequency component, the measurement circuit 112 may configure, as the error filter, a first band-pass filter configured to pass therethrough a frequency band corresponding to the first adjacent channel. In some embodiments as shown in FIG. 1, the first band-pass filter may be a band-pass filter configured to pass therethrough a signal of a frequency band of −150 MHz to −50 MHz with reference to a center frequency of the target channel. That is, if the magnitude of the first frequency component is greater than the magnitude of the second frequency component, the measurement circuit 112 may configure the error filter to pass therethrough a signal of a frequency band corresponding to the first adjacent channel so that the pre-distortion coefficient is updated to reduce the magnitude of the first frequency component.

Otherwise, if the magnitude of the second frequency component is greater than or equal to the magnitude of the first frequency component, the measurement circuit 112 may configure, as the error filter, a second band-pass filter configured to pass therethrough a frequency band corresponding to the second adjacent channel. In some embodiments as shown in FIG. 1, the second band-pass filter may be a band-pass filter configured to pass therethrough a signal of a frequency band of +50 MHz to +150 MHz with reference to the center frequency of the target channel. That is, if the magnitude of the second frequency component is greater than or equal to the magnitude of the first frequency component, the measurement circuit 112 may configure the error filter to pass therethrough a signal of a frequency band corresponding to the second adjacent channel so that the pre-distortion coefficient is updated to reduce the magnitude of the second frequency component.

If the difference value between the magnitude of the first frequency component and the magnitude of the second frequency component is less than the reference difference value, the measurement circuit 112 may end updating the pre-distortion coefficient by the pre-distortion coefficient update circuit 114. This is because it is difficult to additionally balance magnitudes of frequency components even though the pre-distortion coefficient is updated because the magnitude of the first frequency component is symmetrical to the magnitude of the second frequency component if the difference value between the magnitude of the first frequency component and the magnitude of the second frequency component is less than the reference difference value.

In some embodiments, the measurement circuit 112 may configure the error filter based on the magnitude of the first frequency component, the magnitude of the second frequency component, and an error vector magnitude (EVM) value of the output signal OS.

The measurement circuit 112 may configure the error filter based on the magnitude of the first frequency component, the magnitude of the second frequency component, and the EVM value of the output signal OS if the difference value between the magnitude of the first frequency component and the magnitude of the second frequency component is greater than or equal to the reference difference value and the EVM value of the output signal OS is less than a first reference EVM value. The first reference EVM value may be a reference value for determining whether an EVM value satisfies a specification according to a communication standard. If the difference value between the magnitude of the first frequency component and the magnitude of the second frequency component is greater than or equal to the reference difference value and the EVM value of the output signal OS is less than the first reference EVM value, the measurement circuit 112 may configure the error filter to pass therethrough a signal of a particular frequency band so that the pre-distortion coefficient is updated with reference to the passed signal of the particular frequency band.

If the EVM value of the output signal OS is less than a second reference EVM value, the measurement circuit 112 may configure, as the error filter, a third band-pass filter configured to pass therethrough a frequency band corresponding to the first adjacent channel and a frequency band corresponding to the second adjacent channel. The second reference EVM value is a reference value for determining whether an EVM value satisfies a specification according to a communication standard even if the EVM value increases, and the second reference EVM value may be less than the first reference EVM value. If the EVM value of the output signal OS is less than the second reference EVM value, the processor 110 may increase the EVM value of the output signal OS and decrease the magnitude of the first frequency component and the magnitude of the second frequency component. In some embodiments as shown in FIG. 1, the third band-pass filter may be a band-pass filter configured to pass therethrough a signal of a frequency band of −150 MHz to −50 MHz and a signal of a frequency band of +50 MHz to +150 MHz with reference to the center frequency of the target channel. That is, if the EVM value of the output signal OS is less than the second reference EVM value, the measurement circuit 112 may configure the error filter so that the pre-distortion coefficient is updated to increase the EVM value of the output signal OS and decrease the magnitude of the first frequency component and the magnitude of the second frequency component.

If the EVM value of the output signal OS is greater than or equal to the second reference EVM value, and the magnitude of the first frequency component is greater than the magnitude of the second frequency component, the measurement circuit 112 may configure, as the error filter, the first band-pass filter configured to pass therethrough a frequency band corresponding to the first adjacent channel. If the EVM value of the output signal OS is greater than or equal to the second reference EVM value, the measurement circuit 112 may increase the EVM value of the output signal OS. This is a case where the magnitude of the first frequency component is greater than the magnitude of the second frequency component, and thus, the measurement circuit 112 may configure the error filter to pass therethrough a signal of a frequency band corresponding to the first adjacent channel so that the pre-distortion coefficient is updated to decrease the magnitude of the first frequency component.

Otherwise, if the EVM value of the output signal OS is greater than or equal to the second reference EVM value, and the magnitude of the second frequency component is greater than or equal to the magnitude of the first frequency component, the measurement circuit 112 may configure, as the error filter, the second band-pass filter configured to pass therethrough a frequency band corresponding to the second adjacent channel. This is a case where the magnitude of the second frequency component is greater than or equal to the magnitude of the first frequency component, and thus, the measurement circuit 112 may configure the error filter to pass therethrough a signal of a frequency band corresponding to the second adjacent channel so that the pre-distortion coefficient is updated to decrease the magnitude of the second frequency component.

If the difference value between the magnitude of the first frequency component and the magnitude of the second frequency component is less than the reference difference value, or the EVM value of the output signal OS is greater than or equal to the first reference EVM value, the measurement circuit 112 may end updating the pre-distortion coefficient by the pre-distortion coefficient update circuit 114. This is because it is difficult to additionally balance magnitudes of frequency components even though the pre-distortion coefficient is updated because the magnitude of the first frequency component is symmetrical to the magnitude of the second frequency component if the difference value between the magnitude of the first frequency component and the magnitude of the second frequency component is less than the reference difference value and because the EVM value of the output signal OS cannot be increased if the EVM value of the output signal OS is greater than or equal to the first reference EVM value.

A configuration result of the error filter by the measurement circuit 112 may be provided to the filtering circuit 113.

The filtering circuit 113 may filter an error signal by using the error filter configured by the measurement circuit 112, thereby generating a filtered error signal.

The error signal is a signal to be used to determine whether the nonlinearity of the power amplifier 121 has been properly compensated for by the pre-distortion of the input signal IS by the pre-distortion circuit 111 and may be calculated based on the input signal IS and the output signal OS. For example, the error signal may be calculated based on a difference between the input signal IS and a result obtained by multiplying the output signal OS by a reciprocal of an amplification coefficient of the power amplifier 121. A method of obtaining the error signal may be represented by Equation 1 below:

$$ES = IS - \frac{1}{G} \cdot OS \qquad \text{[Equation 1]}$$

where ES denotes the error signal, IS denotes the input signal, OS denotes the output signal, and G denotes the amplification coefficient of the power amplifier 121.

When the first band-pass filter is configured as the error filter, the filtering circuit 113 may generate a filtered error signal by passing therethrough a frequency band corresponding to the first adjacent channel in the error signal. When the second band-pass filter is configured as the error filter, the filtering circuit 113 may generate the filtered error signal by passing therethrough a frequency band corresponding to the second adjacent channel in the error signal. When the third band-pass filter is configured as the error filter, the filtering circuit 113 may generate the filtered error signal by passing therethrough a frequency band corresponding to the first adjacent channel and a frequency band corresponding to the second adjacent channel in the error signal. However, the inventive concept is not limited thereto, and according to a determination result of the processor 110, the filtering circuit 113 may pass therethrough an arbitrary particular frequency band that is different from a frequency band which the first band-pass filter, the second band-pass filter, or the third band-pass filter passes therethrough. Accordingly, the processor 110 may change a frequency characteristic corresponding to the arbitrary particular frequency band having passed through the filtering circuit 113.

In this case, if it is determined by the measurement circuit 112 that the filtering condition is satisfied, the filtering circuit 113 may filter the error signal by using the error filter configured by the measurement circuit 112, thereby generating the filtered error signal. That is, if it is determined that the filtering condition is not satisfied, the error signal may not be filtered. This is because the magnitude of the first frequency component and the magnitude of the second frequency component may be reduced based on the entire error signal because the magnitude of the first frequency component and the magnitude of the second frequency component are not sufficiently reduced by the update of the pre-distortion coefficient if the filtering condition is not satisfied.

The filtering circuit 113 may deliver the error signal or the filtered error signal to the pre-distortion coefficient update circuit 114.

The pre-distortion coefficient update circuit 114 may update the pre-distortion coefficient based on the error signal or the filtered error signal.

Herein, if it is determined that the filtering condition is not satisfied, the pre-distortion coefficient update circuit 114 may update the pre-distortion coefficient based on the error signal. Otherwise, if it is determined that the filtering condition is satisfied, the pre-distortion coefficient update circuit 114 may update the pre-distortion coefficient based on the filtered error signal.

The pre-distortion coefficient update circuit 114 may update the pre-distortion coefficient so that the error signal is minimized or reduced. The pre-distortion coefficient update circuit 114 may deliver the updated pre-distortion coefficient to the pre-distortion circuit 111.

As described above, the wireless communication device 100 according to the inventive step may update the pre-distortion coefficient by configuring the error filter based on the measured magnitude of the first frequency component and the measured magnitude of the second frequency component and generate the output signal OS by pre-distorting and amplifying the input signal IS based on the updated pre-distortion coefficient, thereby decreasing magnitudes of frequency components of adjacent channels while controlling the magnitudes of the frequency components of the adjacent channels to be symmetrical to each other. In addition, accordingly, the efficiency of the power amplifier 121 may be improved, and current consumption may be reduced.

Figure 4:
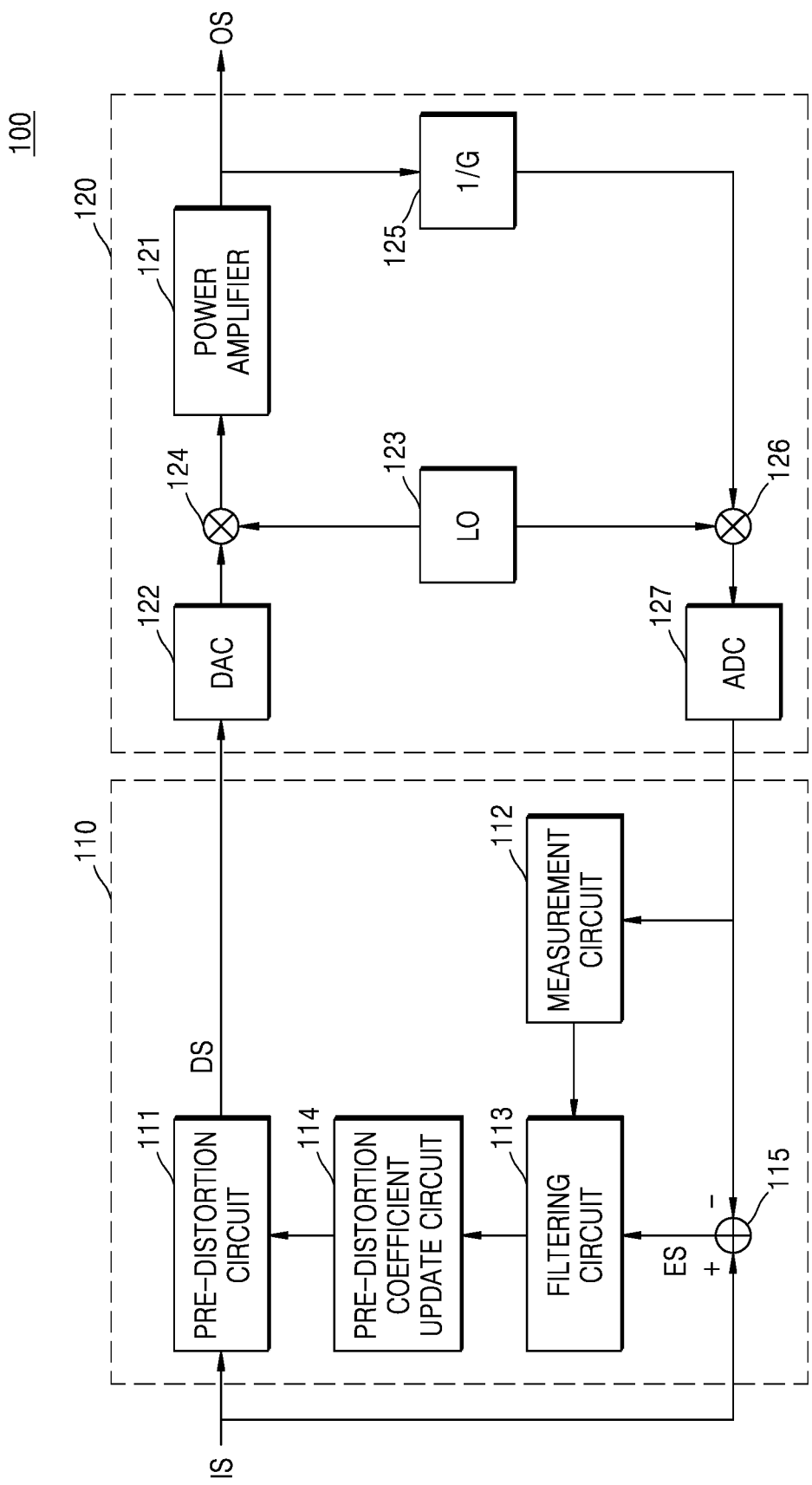
FIG. 4 is a block diagram illustrating components included in the wireless communication device according to some embodiments.

FIG. 4 is a block diagram illustrating components included in the wireless communication device 100 according to some embodiments.

Referring to FIG. 4, the processor 110 of the wireless communication device 100 according to some embodiments may include the pre-distortion circuit 111, the measurement circuit 112, the filtering circuit 113, the pre-distortion coefficient update circuit 114, and a calculator 115. In addition, the RF transmitter 120 of the wireless communication device 100 according to some embodiments may include a digital-to-analog converter (DAC) 122, a local oscillator (LO) 123, a first frequency mixer 124, a scaling circuit 125, a second frequency mixer 126, and an analog-to-digital converter (ADC) 127. Among the components shown in FIG. 4, the pre-distortion circuit 111, the measurement circuit 112, the filtering circuit 113, the pre-distortion coefficient update circuit 114, and the power amplifier 121 perform the same or similar operations as described above with reference to FIG. 3, and thus, components not shown in FIG. 3 and differences from FIG. 3 are mainly described hereinafter.

The pre-distortion circuit 111 may generate the pre-distortion signal DS by pre-distorting the input signal IS. Herein, the input signal IS and the pre-distortion signal DS may be digital signals. The pre-distortion circuit 111 may provide the pre-distortion signal DS to the DAC 122.

The DAC 122 may receive the pre-distortion signal DS from the pre-distortion circuit 111. The DAC 122 may convert a digital form of the pre-distortion signal DS into an analog form. The DAC 122 may provide the analog form of the pre-distortion signal DS to the first frequency mixer 124.

The LO 123 may generate a signal for modulating a baseband signal to a high frequency signal or modulating a high frequency signal to a baseband signal. The LO 123 may provide the generated signal to be used for modulation to the first frequency mixer 124.

The first frequency mixer 124 may receive the analog form of the pre-distortion signal DS and the signal generated by the LO 123. Then, the first frequency mixer 124 may multiply the received signals to modulate the analog form of the pre-distortion signal DS to a high frequency signal. The first frequency mixer 124 may provide the modulated analog form of the pre-distortion signal DS to the power amplifier 121.

The power amplifier 121 may generate the output signal OS by amplifying the received pre-distortion signal DS. The power amplifier 121 may provide the output signal OS to the antenna 130 (see FIG. 2) and the scaling circuit 125.

The scaling circuit 125 may scale the output signal OS. Herein, the scaling circuit 125 may scale the output signal OS by a reciprocal of the amplification coefficient of the power amplifier 121 so that the scaled output signal OS has the same magnitude as the input signal IS. The output signal OS scaled by the scaling circuit 125 may be used to calculate an error signal. The scaling circuit 125 may output the scaled output signal OS to the second frequency mixer 126.

The second frequency mixer 126 may receive the scaled output signal OS and the signal generated by the LO 123. Then, the second frequency mixer 126 may multiply the received signals to modulate the scaled output signal OS to a baseband signal. The second frequency mixer 126 may provide the modulated scaled output signal OS to the measurement circuit 112 and the calculator 115. Herein, the modulated scaled output signal OS of the second frequency mixer 126 may be converted into a digital form by the ADC 127 and then provided to the measurement circuit 112 and the calculator 115.

The calculator 115 may receive the input signal IS and the scaled output signal OS. The calculator 115 may generate an error signal ES by subtracting the scaled output signal OS from the input signal IS. That is, the error signal ES may be generated by performing a calculation, such as Equation 1, through the scaling circuit 125 and the calculator 115. The error signal ES generated by the calculator 115 may be provided to the filtering circuit 113.

Operations of the measurement circuit 112, the filtering circuit 113, and the pre-distortion coefficient update circuit 114 may be the same as described above with reference to FIG. 3.

Figure 5:
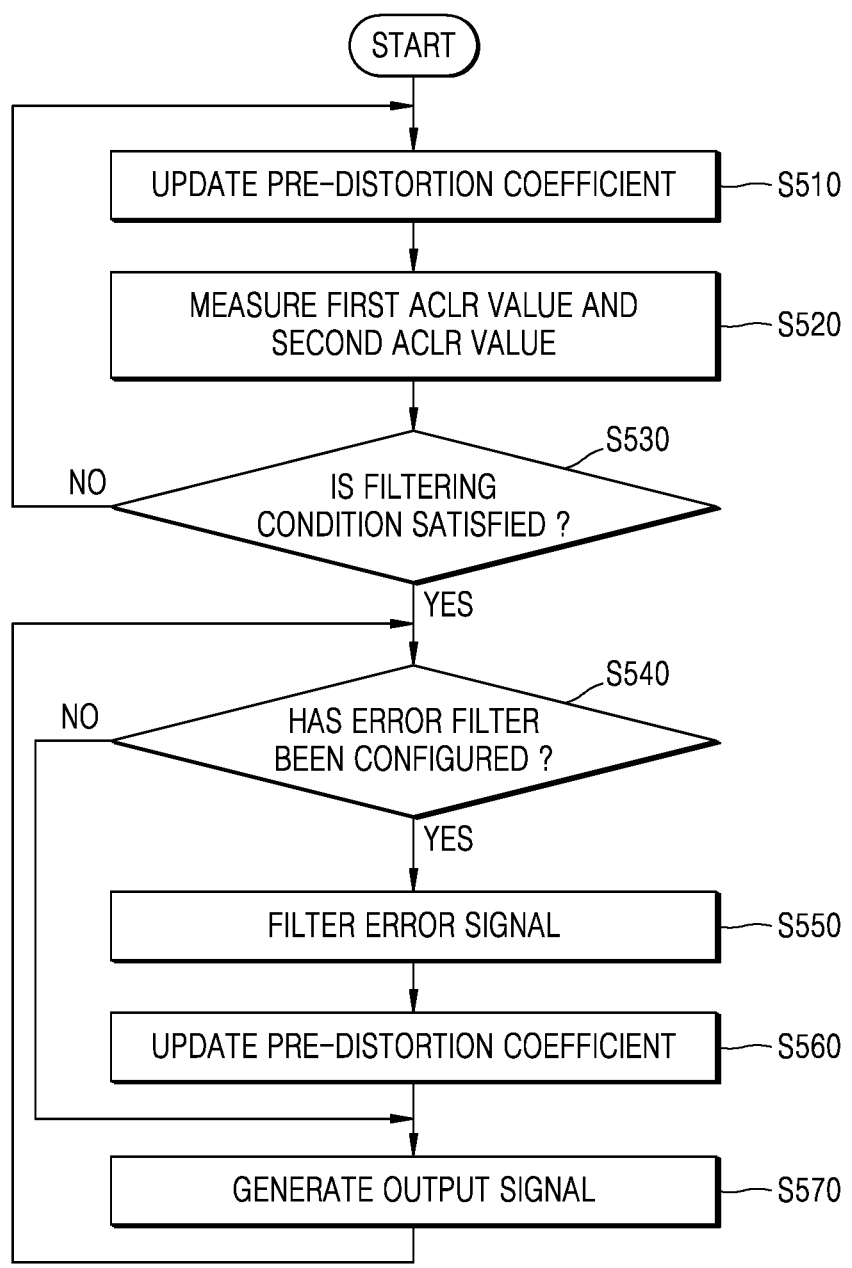
FIG. 5 is a flowchart illustrating an operating method of a wireless communication device, according to some embodiments.

FIG. 5 is a flowchart illustrating an operating method of a wireless communication device, according to some embodiments. The embodiments of FIG. 5 and below are described based on an example of measuring an ACLR value as a magnitude of a frequency component.

Referring to FIG. 5, in operation S510, the pre-distortion coefficient update circuit 114 may update the pre-distortion coefficient. Herein, the pre-distortion coefficient update circuit 114 may update the pre-distortion coefficient based on the error signal ES. This is because an ACLR value may be reduced even though the pre-distortion coefficient is updated based on the entire error signal ES if operation S510 is performed initially or by determining in operation S530 that the filtering condition is not satisfied.

In operation S520, the measurement circuit 112 may measure the first ACLR value and the second ACLR value. The measurement circuit 112 may measure the first ACLR value and the second ACLR value by the output signal OS generated by amplifying the input signal IS pre-distorted based on the pre-distortion coefficient updated in operation S510.

In operation S530, the measurement circuit 112 may determine whether the filtering condition is satisfied. The measurement circuit 112 may determine that the filtering condition is satisfied if it is determined that the first ACLR value and the second ACLR value are converged, or if the pre-distortion coefficient update number is greater than or equal to the reference update number.

If it is determined that the filtering condition is not satisfied, the operating method may proceed back to operation S510. In this case, the pre-distortion coefficient may be updated again based on the error signal ES, and the first ACLR value and the second ACLR value may be measured again based on the output signal OS generated based on the updated pre-distortion coefficient.

If it is determined that the filtering condition is satisfied, in operation S540, it may be determined that the measurement circuit 112 has configured the error filter.

In more detail, the measurement circuit 112 may configure the error filter or end updating the pre-distortion coefficient. Upon ending the updating of the pre-distortion coefficient, the output signal may be generated, by progressing to operation S570.

In some embodiments, the measurement circuit 112 may configure the error filter based on the first ACLR value and the second ACLR value. Herein, if a difference value between the first ACLR value and the second ACLR value is less than the reference difference value, the measurement circuit 112 may not configure the error filter and may end updating the pre-distortion coefficient by the pre-distortion coefficient update circuit 114. At this point, the power amplifier 121 may generate the output signal, at operation S570. Otherwise, if the difference value between the first ACLR value and the second ACLR value is greater than or equal to the reference difference value, the measurement circuit 112 may configure the error filter. This is described below in more detail with reference to FIG. 6.

In some embodiments, the measurement circuit 112 may configure the error filter based on the first ACLR value, the second ACLR value, and the EVM value of the output signal OS. Herein, if the difference value between the first ACLR value and the second ACLR value is less than the reference difference value, or the EVM value of the output signal OS is greater than or equal to the first reference EVM value, the measurement circuit 112 may not configure the error filter and may end updating the pre-distortion coefficient by the pre-distortion coefficient update circuit 114. Otherwise, if the difference value between the first ACLR value and the second ACLR value is greater than or equal to the reference difference value and the EVM value of the output signal OS is less than the first reference EVM value, the measurement circuit 112 may configure the error filter. This is described below in more detail with reference to FIG. 7.

If the measurement circuit 112 does not configure the error filter, the measurement circuit 112 may end updating the pre-distortion coefficient by the pre-distortion coefficient update circuit 114.

Otherwise, if the measurement circuit 112 configures the error filter, in operation S550, the filtering circuit 113 may filter the error signal ES. The filtering circuit 113 may filter the error signal ES by using the error filter configured by the measurement circuit 112 in operation S540, thereby generating a filtered error signal.

In operation S560, the pre-distortion coefficient update circuit 114 may update the pre-distortion coefficient. Herein, the pre-distortion coefficient update circuit 114 may update the pre-distortion coefficient based on the filtered error signal ES. This is because an ACLR value is not reduced or is meaninglessly reduced if the pre-distortion coefficient is updated based on the entire error signal ES instead of the filtered error signal ES when it is determined in operation S530 that the filtering condition is satisfied.

In operation S570, the pre-distortion circuit 111 and the power amplifier 121 may generate the output signal OS by pre-distorting and amplifying the input signal IS. The pre-distortion circuit 111 may generate the pre-distortion signal DS by pre-distorting the input signal IS, and the power amplifier 121 may generate the output signal OS by amplifying the pre-distortion signal DS. Thereafter, the operating method may proceed back to operation S540.

As described above, the operating method of the wireless communication device 100, according to the inventive step, may include updating the pre-distortion coefficient by configuring the error filter based on the measured first ACLR value and second ACLR value, and generating the output signal OS by pre-distorting and amplifying the input signal IS based on the updated pre-distortion coefficient, thereby reducing ACLR values of adjacent channels while controlling the ACLR values of the adjacent channels to be symmetrical to each other. In addition, accordingly, the efficiency of the power amplifier 121 may be improved, and current consumption may be reduced.

Figure 6:
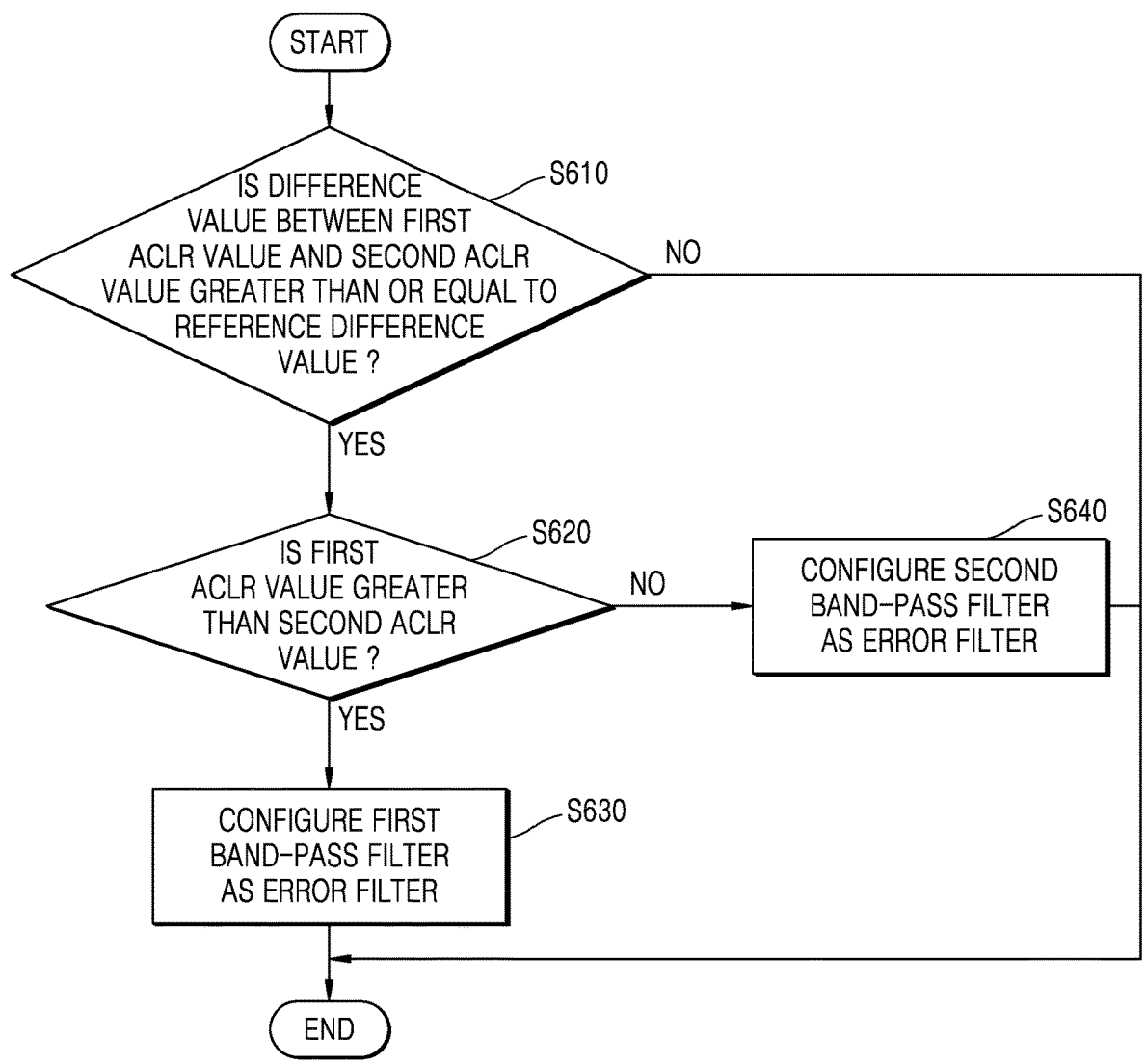
FIG. 6 is a flowchart illustrating a method, performed by a wireless communication device, of configuring an error filter, according to some embodiments.

FIG. 6 is a flowchart illustrating a method, performed by a wireless communication device, of configuring an error filter, according to some embodiments.

Referring to FIG. 6, in operation S610, the measurement circuit 112 may determine whether the difference value between the first ACLR value and the second ACLR value is greater than or equal to the reference difference value.

If it is determined that the difference value between the first ACLR value and the second ACLR value is not greater than or equal to the reference difference value, updating of the pre-distortion coefficient by the pre-distortion coefficient update circuit 114 may end.

Otherwise, if it is determined that the difference value between the first ACLR value and the second ACLR value is greater than or equal to the reference difference value, in operation S620, the measurement circuit 112 may determine whether the first ACLR value is greater than the second ACLR value.

If it is determined that the first ACLR value is greater than the second ACLR value, in operation S630, the measurement circuit 112 may configure the first band-pass filter as the error filter.

Otherwise, if it is determined that the first ACLR value is less than or equal to the second ACLR value, in operation S640, the measurement circuit 112 may configure the second band-pass filter as the error filter.

Figure 7:
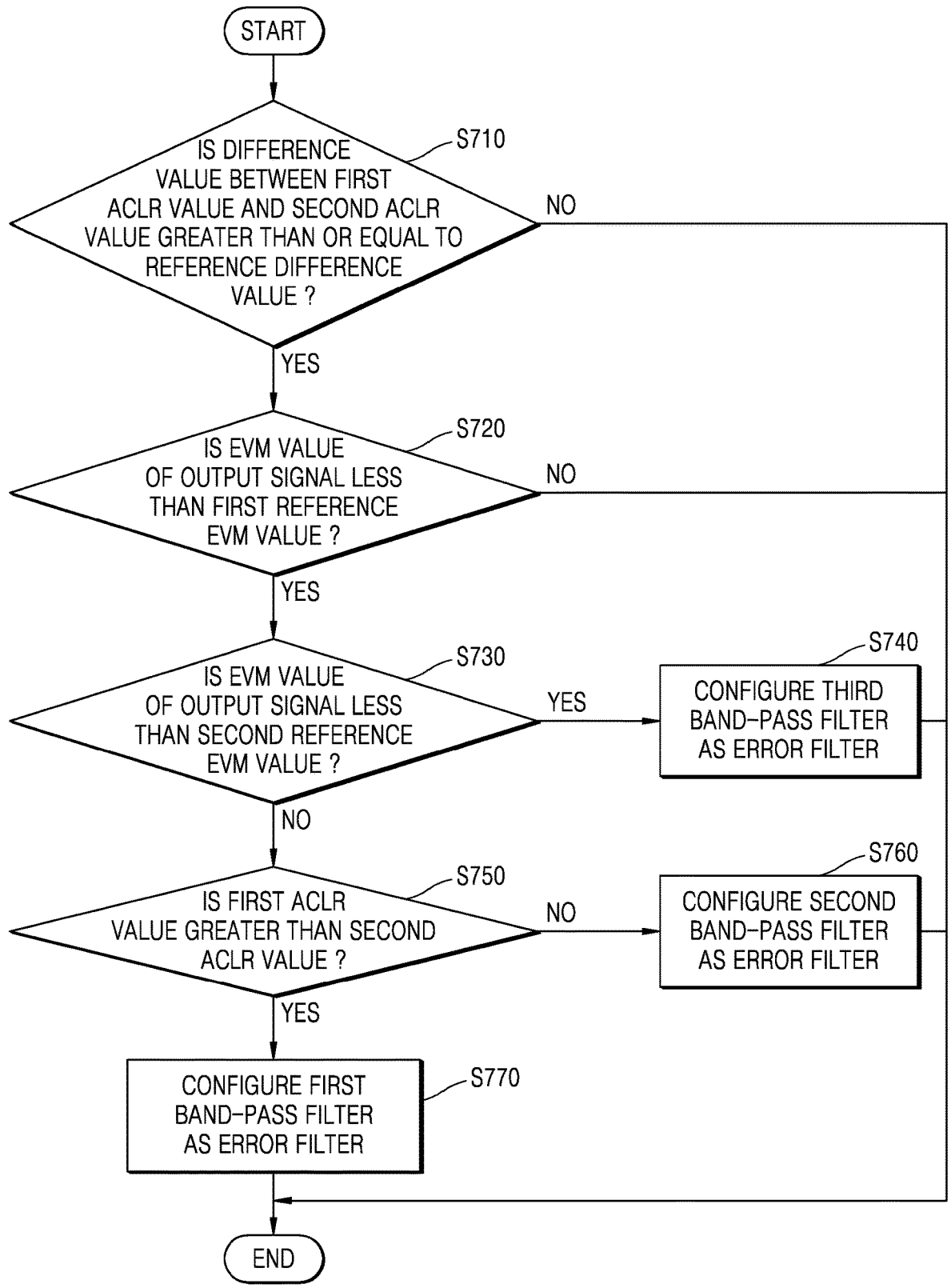
FIG. 7 is a flowchart illustrating a method, performed by a wireless communication device, of configuring an error filter, according to another embodiment.

FIG. 7 is a flowchart illustrating a method, performed by a wireless communication device, of configuring an error filter, according to some embodiments.

Referring to FIG. 7, in operation S710, the measurement circuit 112 may determine whether the difference value between the first ACLR value and the second ACLR value is greater than or equal to the reference difference value.

If it is determined that the difference value between the first ACLR value and the second ACLR value is not greater than or equal to the reference difference value, updating of the pre-distortion coefficient by the pre-distortion coefficient update circuit 114 may end.

Otherwise, if it is determined that the difference value between the first ACLR value and the second ACLR value is greater than or equal to the reference difference value, in operation S720, the measurement circuit 112 may determine whether an EVM value of an output signal is less than the first reference EVM value.

If it is determined that the EVM value of the output signal is greater than or equal to the first reference EVM value, updating of the pre-distortion coefficient by the pre-distortion coefficient update circuit 114 may end.

Otherwise, if it is determined that the EVM value of the output signal is less than the first reference EVM value, in operation S730, the measurement circuit 112 may determine whether the EVM value of the output signal is less than the second reference EVM value.

If it is determined that the EVM value of the output signal is less than the second reference EVM value, in operation S740, the measurement circuit 112 may configure the third band-pass filter as the error filter.

Otherwise, if it is determined that the EVM value of the output signal is greater than or equal to the second reference EVM value, in operation S750, the measurement circuit 112 may determine whether the first ACLR value is greater than the second ACLR value.

If it is determined that the first ACLR value is less than or equal to the second ACLR value, in operation S760, the measurement circuit 112 may configure the second band-pass filter as the error filter.

Otherwise, if it is determined that the first ACLR value is greater than the second ACLR value, in operation S770, the measurement circuit 112 may configure the first band-pass filter as the error filter.

Figure 8:
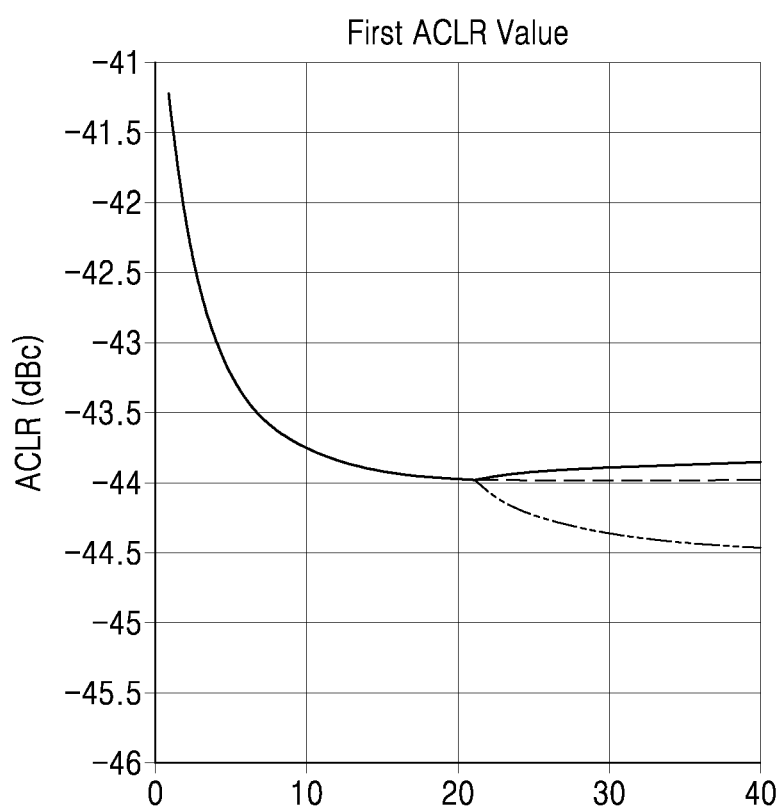
FIG. 8 is a graph illustrating a change in a first adjacent channel leakage ratio (ACLR) value when a wireless communication device according to some embodiments is used.
Figure 9:
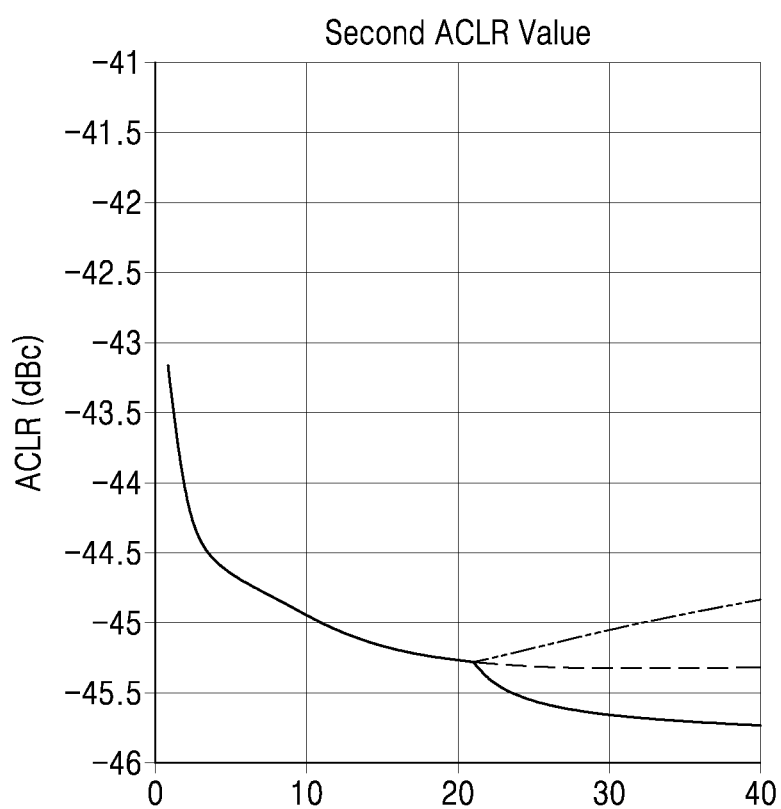
FIG. 9 is a graph illustrating a change in a second ACLR value when a wireless communication device according to some embodiments is used.

FIG. 8 is a graph illustrating a change in the first ACLR value when a wireless communication device according to some embodiments is used. FIG. 9 is a graph illustrating a change in the second ACLR value when a wireless communication device according to some embodiments is used.

Referring to FIG. 8, when the wireless communication device 100 according to some embodiments is used, a change in the first ACLR value (a vertical axis) according to a pre-distortion coefficient update number (a horizontal axis) may be identified. Referring to FIG. 9, when the wireless communication device 100 according to some embodiments is used, a change in the second ACLR value (the vertical axis) according to the pre-distortion coefficient update number (the horizontal axis) may be identified. In some embodiments of FIGS. 8 and 9, an error filter is configured after the pre-distortion coefficient update number exceeds 20, as a non-limiting example of the reference update number.

In the graphs of FIGS. 8 and 9, a dashed line indicates changes in the first ACLR value and the second ACLR value when the pre-distortion coefficient is updated without configuring the error filter. In addition, an alternate long and two short dashes line indicates changes in the first ACLR value and the second ACLR value when the error filter is the first band-pass filter, and a solid line indicates changes in the first ACLR value and the second ACLR value when the error filter is the second band-pass filter.

When the error filter is not configured, it may be identified that the changes in the first ACLR value and the second ACLR value are meaningless even though the pre-distortion coefficient is updated. When the error filter is the first band-pass filter, it may be identified that the first ACLR value decreases, and the second ACLR value increases. When the error filter is the second band-pass filter, it may be identified that the first ACLR value increases, and the second ACLR value decreases.

In embodiments of FIGS. 8 and 9, when the pre-distortion coefficient update number is 20, the first ACLR value is about −44 dBc and the second ACLR value is about −45.25 dBc, and thus, the wireless communication device 100 according to the inventive concept may configure the first band-pass filter as the error filter. Accordingly, the first ACLR value decreases and the second ACLR value increases, and thus, a worse one of the first ACLR value decreases and the second ACLR value may decrease.

Figure 10:
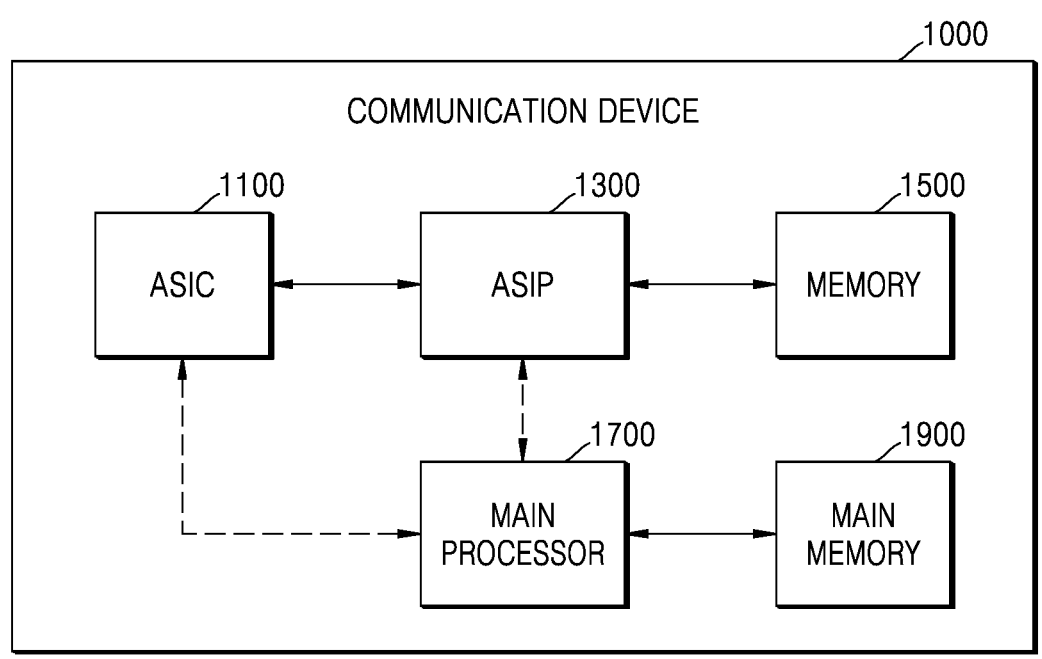
FIG. 10 is a block diagram illustrating a wireless communication device according to some embodiments.

FIG. 10 is a block diagram illustrating a wireless communication device 1000 according to some embodiments.

Referring to FIG. 10, the wireless communication device 1000 may include an application specific integrated circuit (ASIC) 1100, an application specific instruction set processor (ASIP) 1300, a memory 1500, a main processor 1700, and a main memory 1900. Two or more of the ASIC 1100, the ASIP 1300, and the main processor 1700 may communicate with each other. In addition, at least two of the ASIC 1100, the ASIP 1300, the memory 1500, the main processor 1700, and the main memory 1900 may be embedded in one chip.

The ASIP 1300 is an integrated circuit customized for a particular usage and may support an exclusive instruction set for a particular application and execute instructions included in the instruction set. The memory 1500 may communicate with the ASIP 1300 and store, as a non-transitory storage device, a plurality of instructions to be executed by the ASIP 1300. For example, the memory 1500 may include, as a non-limiting example, arbitrary types of memories accessible by the ASIP 1300, such as random access memory (RAM), read-only memory (ROM), tape, a magnetic disk, an optical disc, a volatile memory, a nonvolatile memory, and a combination thereof.

The main processor 1700 may control the wireless communication device 1000 by executing the plurality of instructions. For example, the main processor 1700 may control the ASIC 1100 and the ASIP 1300 and process received data or a user input on the wireless communication device 1000. The main memory 1900 may communicate with the main processor 1700 and store, as a non-transitory storage device, a plurality of instructions to be executed by the main processor 1700. For example, the main memory 1900 may include, as a non-limiting example, arbitrary types of memories accessible by the main processor 1700, such as RAM, ROM, tape, a magnetic disk, an optical disc, a volatile memory, a nonvolatile memory, and a combination thereof.

The wireless communication device 100 and the operating method of the wireless communication device 100, according to some embodiments, which are described above with reference to FIGS. 1 to 9, may be achieved by at least one of the components included in the wireless communication device 1000 of FIG. 10. In some embodiments, at least one operation in the operating method of a wireless communication, which has been described above, may be implemented by the plurality of instructions stored in the memory 1500. In some embodiments, the ASIP 1300 may execute the plurality of instructions stored in the memory 1500 to perform at least one of the operations in the operating method described above.

While the inventive concept has been particularly shown and described with reference to embodiments thereof, it will be understood that various changes in form and details may be made therein without departing from the spirit and scope of the following claims.

What is claimed is:

1. A wireless communication device comprising:
 a pre-distortion circuit configured to generate a pre-distortion signal by pre-distorting an input signal based on a pre-distortion coefficient;
 a power amplifier configured to generate an output signal by amplifying the pre-distortion signal;
 a measurement circuit configured to measure a magnitude of a first frequency component of a first adjacent channel and a magnitude of a second frequency component of a second adjacent channel of the output signal;

a filtering circuit that comprises an error filter, wherein the filtering circuit is configured to generate a filtered error signal by filtering an error signal that is based on the input signal and the output signal generated by the power amplifier, wherein the error filter is configured to generate the error signal based on the magnitude of the first frequency component and the magnitude of the second frequency component; and a pre-distortion coefficient update circuit configured to update the pre-distortion coefficient based on the error signal or the filtered error signal.

2. The wireless communication device of claim 1, wherein the measurement circuit is further configured to determine whether a filtering condition is satisfied, and wherein, when the filtering condition is satisfied, the error filter is used by the filtering circuit to generate the error signal.

3. The wireless communication device of claim 2, wherein the filtering condition comprises at least one of whether the magnitude of the first frequency component and the magnitude of the second frequency component are converged or whether a pre-distortion coefficient update number is greater than a reference update number.

4. The wireless communication device of claim 2, wherein the measurement circuit configures the error filter based on the magnitude of the first frequency component and the magnitude of the second frequency component when a difference value between the magnitude of the first frequency component and the magnitude of the second frequency component is greater than or equal to a reference difference value, and configured to end updating of the pre-distortion coefficient by the pre-distortion coefficient update circuit when the difference value between the magnitude of the first frequency component and the magnitude of the second frequency component is less than the reference difference value.

5. The wireless communication device of claim 4, wherein the measurement circuit configures the error filter as a first band-pass filter that is configured to pass a frequency band corresponding to the first adjacent channel when the magnitude of the first frequency component is greater than the magnitude of the second frequency component, and configures the error filter as a second band-pass filter that is configured to pass a frequency band corresponding to the second adjacent channel when the magnitude of the second frequency component is greater than or equal to the magnitude of the first frequency component.

6. The wireless communication device of claim 2, wherein the measurement circuit configures the error filter based on the magnitude of the first frequency component, the magnitude of the second frequency component, and an error vector magnitude (EVM) value of the output signal when a difference value between the magnitude of the first frequency component and the magnitude of the second frequency component is greater than or equal to a reference difference value and the EVM value of the output signal is less than a first reference EVM value, and wherein the pre-distortion coefficient update circuit is configured to end updating the pre-distortion coefficient when the difference value between the magnitude of the first frequency component and the magnitude of the second frequency component is less than the reference difference value or the EVM value of the output signal is greater than or equal to the first reference EVM value.

7. The wireless communication device of claim 6, wherein the measurement circuit configures the error filter as a third band-pass filter configured to pass a frequency band corresponding to the first adjacent channel and a frequency band corresponding to the second adjacent channel when the EVM value of the output signal is less than a second reference EVM value, configures the error filter as a first band-pass filter configured to pass a frequency band corresponding to the first adjacent channel when the EVM value of the output signal is greater than or equal to the second reference EVM value and the magnitude of the first frequency component is greater than the magnitude of the second frequency component, and configures the error filter as a second band-pass filter configured to pass a frequency band corresponding to the second adjacent channel when the EVM value of the output signal is greater than or equal to the second reference EVM value and the magnitude of the second frequency component is greater than or equal to the magnitude of the first frequency component.

8. The wireless communication device of claim 2, wherein the filtering circuit is further configured to generate the filtered error signal by filtering the error signal based on the error filter configured by the measurement circuit when it is determined that the filtering condition is satisfied.

9. The wireless communication device of claim 2, wherein the pre-distortion coefficient update circuit is further configured to update the pre-distortion coefficient based on the error signal when it is determined that the filtering condition is not satisfied, and further configured to update the pre-distortion coefficient based on the filtered error signal when it is determined that the filtering condition is satisfied.

10. The wireless communication device of claim 1, wherein the error signal is determined based on a difference between the input signal and a result obtained by multiplying the output signal by a reciprocal of an amplification coefficient of the power amplifier.

11. An operating method of a wireless communication device for generating an output signal by pre-distorting and amplifying an input signal, the operating method comprising:

updating a pre-distortion coefficient based on an error signal determined based on the input signal and the output signal;

measuring a magnitude of a first frequency component of a first adjacent channel and a magnitude of a second frequency component of a second adjacent channel by the output signal;

configuring an error filter based on the magnitude of the first frequency component and the magnitude of the second frequency component when a filtering condition is satisfied;

generating a filtered error signal by using the error filter to filter the error signal;

updating the pre-distortion coefficient based on the filtered error signal; and generating the output signal by pre-distorting and amplifying the input signal based on the pre-distortion coefficient that was updated.

12. The operating method of claim 11, wherein the filtering condition comprises at least one of whether the magnitude of the first frequency component and the magnitude of the second frequency component are converged or whether a pre-distortion coefficient update number is greater than a reference update number,
wherein the magnitude of the first frequency component and the magnitude of the second frequency component are converged when a channel quality of the first frequency component and a channel quality of the second frequency component are equal to one another.

13. The operating method of claim 11, wherein the configuring the error filter comprises configuring the error filter based on the magnitude of the first frequency component and the magnitude of the second frequency component when a difference value between the magnitude of the first frequency component and the magnitude of the second frequency component is greater than or equal to a reference difference value.

14. The operating method of claim 13, wherein the configuring the error filter comprises:
configuring, as the error filter, a first band-pass filter configured to pass a frequency band corresponding to the first adjacent channel when the magnitude of the first frequency component is greater than the magnitude of the second frequency component; and
configuring, as the error filter, a second band-pass filter configured to pass a frequency band corresponding to the second adjacent channel when the magnitude of the second frequency component is greater than or equal to the magnitude of the first frequency component.

15. The operating method of claim 11, wherein the configuring the error filter comprises configuring the error filter based on the magnitude of the first frequency component, the magnitude of the second frequency component, and an error vector magnitude (EVM) value of the output signal when a difference value between the magnitude of the first frequency component and the magnitude of the second frequency component is greater than or equal to a reference difference value and the EVM value of the output signal is less than a first reference EVM value.

16. The operating method of claim 15, wherein the configuring the error filter comprises:
configuring, as the error filter, a third band-pass filter configured to pass a frequency band corresponding to the first adjacent channel and a frequency band corresponding to the second adjacent channel when the EVM value of the output signal is less than a second reference EVM value;
configuring, as the error filter, a first band-pass filter configured to pass a frequency band corresponding to the first adjacent channel when the EVM value of the output signal is greater than or equal to the second reference EVM value and the magnitude of the first frequency component is greater than the magnitude of the second frequency component; and
configuring, as the error filter, a second band-pass filter configured to pass a frequency band corresponding to the second adjacent channel when the EVM value of the output signal is greater than or equal to the second reference EVM value and the magnitude of the second frequency component is greater than or equal to the magnitude of the first frequency component.

17. A wireless communication device comprising:
a processor configured to generate a pre-distortion signal by pre-distorting an input signal based on a pre-distortion coefficient;
a radio frequency (RF) transmitter configured to generate an output signal by amplifying the pre-distortion signal; and
an antenna configured to transmit the output signal,
wherein the processor is further configured to measure a magnitude of a first frequency component of a first adjacent channel and a magnitude of a second frequency component of a second adjacent channel by the output signal, and generate a filtered error signal by filtering an error signal determined based on the input signal and the output signal,
wherein the filtering is performed using an error filter configured based on the magnitude of the first frequency component and the magnitude of the second frequency component, and
wherein the pre-distortion coefficient is updated based on the error signal or the filtered error signal.

18. The wireless communication device of claim 17, wherein the processor is further configured to determine whether a filtering condition is satisfied, and configure the error filter when it is determined that the filtering condition is satisfied.

19. The wireless communication device of claim 18, wherein the processor configures the error filter as a band-pass filter configured to pass a frequency band corresponding to the first adjacent channel when the magnitude of the first frequency component is greater than the magnitude of the second frequency component, and configures the error filter as a band-pass filter configured to pass a frequency band corresponding to the second adjacent channel when the magnitude of the second frequency component is greater than or equal to the magnitude of the first frequency component.

20. The wireless communication device of claim 18, wherein the processor is further configured to update the pre-distortion coefficient based on the error signal when it is determined that the filtering condition is not satisfied, and update the pre-distortion coefficient based on the filtered error signal when it is determined that the filtering condition is satisfied.

* * * * *